(12) United States Patent
Qiao

(10) Patent No.: US 10,203,445 B2
(45) Date of Patent: Feb. 12, 2019

(54) BACKLIGHT UNIT, DISPLAY PANEL AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Zhonglian Qiao, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 240 days.

(21) Appl. No.: 15/125,464

(22) PCT Filed: Dec. 11, 2015

(86) PCT No.: PCT/CN2015/097098
§ 371 (c)(1),
(2) Date: Sep. 12, 2016

(87) PCT Pub. No.: WO2017/028409
PCT Pub. Date: Feb. 23, 2017

(65) Prior Publication Data
US 2018/0172890 A1   Jun. 21, 2018

(30) Foreign Application Priority Data

Aug. 20, 2015   (CN) .................... 2015 2 0633458 U

(51) Int. Cl.
*F21V 8/00* (2006.01)
*G02F 1/1333* (2006.01)
*G02F 1/1335* (2006.01)

(52) U.S. Cl.
CPC ........... *G02B 6/005* (2013.01); *G02B 6/0031* (2013.01); *G02B 6/0055* (2013.01);
(Continued)

(58) Field of Classification Search
None
See application file for complete search history.

(56) References Cited

U.S. PATENT DOCUMENTS

2006/0290834 A1*  12/2006  Jeon ................... G02F 1/133308
                                                            349/58
2008/0055518 A1*   3/2008  Jung .................... G02B 6/0055
                                                            349/67

(Continued)

FOREIGN PATENT DOCUMENTS

CN   202469750 U   10/2012
CN   103792694 A    5/2014
(Continued)

OTHER PUBLICATIONS

International Search Report and Written Opinon dated May 4, 2016; PCT/CN2015/097098.

*Primary Examiner* — Elmito Breval
(74) *Attorney, Agent, or Firm* — Ladas & Parry LLP

(57) ABSTRACT

A backlight unit, a display panel and a display device are provided. The backlight unit includes a plurality of fixed supports (4) and a back plate (1) provided with a receiving space. Each of the fixed supports (4) is connected to an outer side of a side wall of the back plate (1) and includes a blocking part (41) protruding into upper portion of the receiving space of the back plate (1).

20 Claims, 2 Drawing Sheets

(52) U.S. Cl.
CPC ..... *G02B 6/0081* (2013.01); *G02F 1/133308* (2013.01); *G02F 1/133602* (2013.01); *G02F 1/133615* (2013.01); *G02F 2001/133314* (2013.01)

(56) References Cited

U.S. PATENT DOCUMENTS

| | | | | |
|---|---|---|---|---|
| 2008/0101001 | A1* | 5/2008 | Shin | G02B 6/0088 |
| | | | | 361/679.01 |
| 2011/0090426 | A1* | 4/2011 | Choi | G02B 6/009 |
| | | | | 349/65 |
| 2012/0086883 | A1* | 4/2012 | Wakita | G02B 6/002 |
| | | | | 349/61 |
| 2012/0268868 | A1* | 10/2012 | Yoon | G02F 1/133308 |
| | | | | 361/679.01 |
| 2015/0092448 | A1* | 4/2015 | Oh | G06F 1/1601 |
| | | | | 362/633 |
| 2015/0253494 | A1 | 9/2015 | Zhou et al. | |
| 2016/0259120 | A1 | 9/2016 | Hsiao et al. | |

FOREIGN PATENT DOCUMENTS

| | | | |
|---|---|---|---|
| CN | 103822144 | A | 5/2014 |
| CN | 104315415 | A | 1/2015 |
| CN | 104570475 | A | 4/2015 |
| CN | 204554705 | A | 8/2015 |
| CN | 204853341 | A | 12/2015 |

\* cited by examiner

BACKLIGHT UNIT, DISPLAY PANEL AND DISPLAY DEVICE

TECHNICAL FIELD

Embodiments of the present invention relate to a backlight unit, a display panel and a display device.

BACKGROUND

A backlight unit in a liquid crystal display (LCD) generally uses a light-emitting diode (LED) as a light source. The backlight unit can be classified into direct-lit type backlight unit and edge-lit type backlight unit depending on an arrangement location of the light source.

SUMMARY

Embodiments of the present invention provide a backlight unit, a display panel and a display device.

The backlight unit provided by the embodiments of the present invention includes a plurality of fixed supports and a back plate provided with a receiving space, each of the fixed supports being connected to an outer side of a side wall of the back plate and includes a blocking part protruding into an upper portion of the receiving space of the back plate.

In one or more embodiments, an outer side of each side wall of the back plate is correspondingly connected to at least one of the fixed supports.

In one or more embodiments, each of the fixed supports is connected to the outer side of each side wall of the back plate through a fastener.

In one or more embodiments, each of the fixed supports is an L-shaped fixed support.

In one or more embodiments, the backlight unit further includes a bottom reflector, a light-guide plate and an optical film unit, which are located within the receiving space, the light-guide plate being located on the bottom reflector, and the optical film unit being located on the light-guide plate and below the blocking parts of the plurality of fixed supports. The bottom reflector, the light-guide plate and the optical film unit are each provided with a lug, and the side wall of the back plate is provided with a first notch cooperating with the lug.

In one or more embodiments, at least one of the fixed supports is disposed at a position of the first notch in the side wall of the back plate and is provided with a second notch cooperating with the lug.

Embodiments of the present invention also provide a display panel including a liquid crystal (LC) panel and the backlight unit in any of the preceding technical solutions. The LC panel is fixed on the blocking parts of the plurality of fixed supports of the backlight unit.

In one or more embodiments, the LC panel is fixed on the blocking parts of the plurality of fixed supports of the backlight unit through a double-sided tape.

Embodiments of the present invention also provide a display device including the display panel in any of the preceding technical solutions.

BRIEF DESCRIPTION OF THE DRAWINGS

Embodiments of the present invention will be illustrated in more details in connection with the drawings so as to enable those skilled in the art to understand the disclosure more clearly, in which.

DETAILED DESCRIPTION

Technical solutions according to the embodiments of the present disclosure will be described clearly and understandable as below in conjunction with the accompanying drawings of embodiments of the present disclosure. It is apparent that the described embodiments are only part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "the," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

The backlight unit can be classified into direct-lit type backlight unit and edge-lit type backlight unit depending on a location of the light source. For example, for a edge-lit type backlight unit, a structure thereof mainly includes a back plate having a receiving space; a bottom reflector, a light-guide plate and an optical film unit which are located within the receiving space of the back plate; the light-guide plate is located on the bottom reflector, the optical film unit is located on the light-guide plate; a LED light source is located within the receiving space of the back plate and is located at a light incident side of the light-guide plate; and a rubber frame located above the optical film unit and connected to the back plate.

The inventors of the present invention have found defects presented in this backlight unit, i.e., the structural characteristics of the rubber frame go against a narrow-bezel design, and it requires higher precision and also involves expensive cost for manufacturing it.

The embodiments of the present invention provide a backlight unit, a display panel and a display device, to facilitate achieving the narrow-bezel design of the display device, to improve assembling precision of the display panel and also to reduce a manufacturing cost of the display panel.

Figure 1:
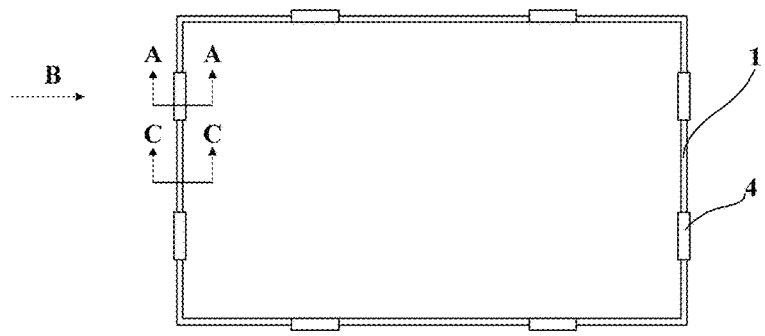
FIG. 1 is a top view illustrating a structure of a display panel as provided by an embodiment of the present invention.
Figure 2:
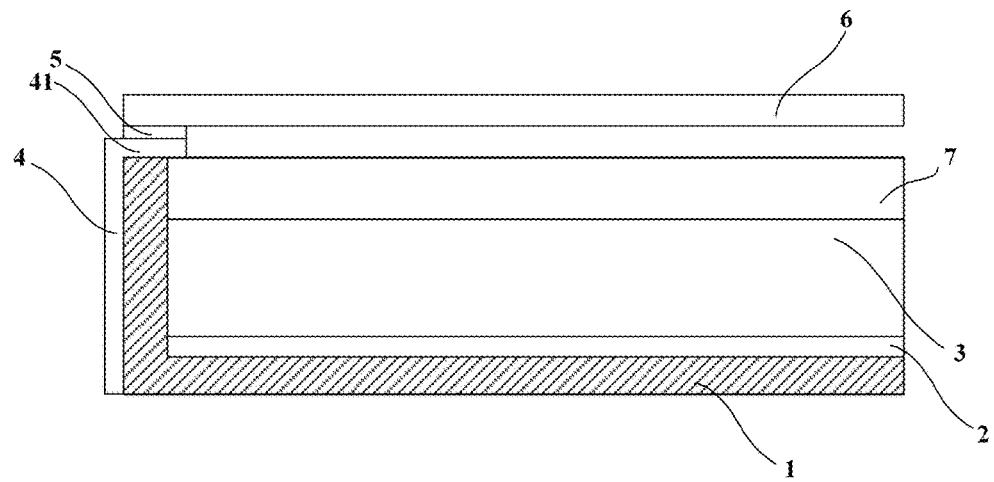
FIG. 2 is a cross-sectional view of a structure taken along C-C direction in FIG. 1.
Figure 3:
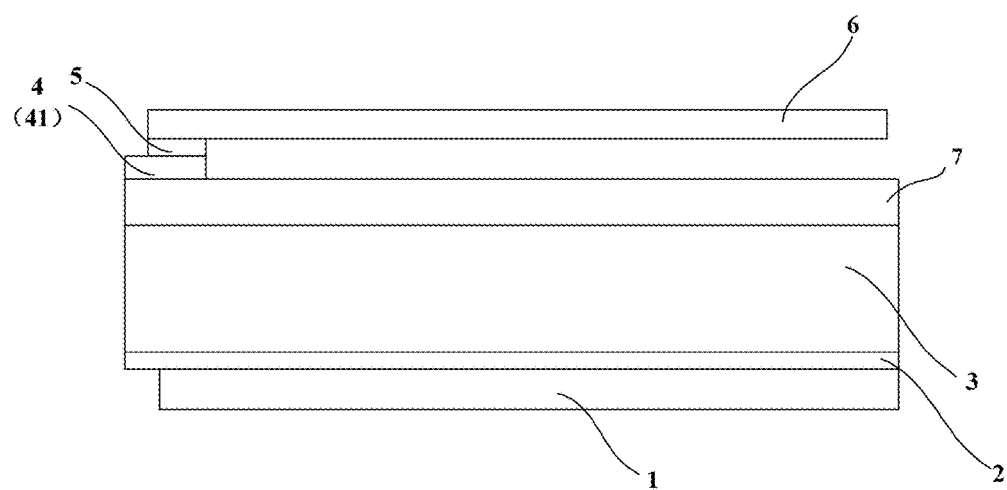
FIG. 3 is a cross-sectional view of a structure taken along A-A direction in FIG. 1.

As illustrated in FIG. 1 to FIG. 3, the backlight unit as provided by the embodiments of the present invention includes a plurality of fixed supports 4 and a back plate 1 having a receiving space. Each of the fixed supports 4 is connected to an outer side of a side wall of the back plate 1 and includes a blocking part 41 protruding into upper portion of the receiving space of the back plate 1.

As illustrated in FIG. 2 and FIG. 3, it is understood that, apart from the above-mentioned components, the backlight unit further includes a light source (not shown), a bottom reflector 2, a light-guide plate 3 and an optical film unit 7. The bottom reflector 2 is located at a bottom of the receiving space of the back plate 1. The light-guide plate 3 is located on the bottom reflector 2. The light source is located at a light incident side of the light-guide plate 3. The optical film unit 7 is located on the light-guide plate 3.

In the technical solutions of one or more embodiments of the present invention, the backlight unit includes a plurality of fixed supports, each of the fixed supports is connected to an outer side of a side wall of the back plate and includes a blocking part protruding into upper portion of the receiving space of the back plate; by replacing the rubber frame with the plurality of fixed supports, the structure is considerably simplified as compared with that using the rubber frame, which facilitates realizing the narrow-bezel design of the display device, increases the assembling precision of the backlight unit and reduces the manufacturing cost of the backlight unit, on the premise of permitting the strength of the structure.

For example, at least one fixed support is correspondingly connected to an outer side of each side wall of the back plate. An amount of the fixed support correspondingly connected to the outer side of the side wall of the back plate is not limited but can be designed according to structural dimensions of the display device. As illustrated in FIG. 1, in this embodiment, two fixed supports 4 are correspondingly connected to the outer side of each side wall of the back plate 1, and upper surfaces of the blocking parts 41 of total eight fixed supports together form a supporting surface for the LC panel, however, the embodiments of the present invention are not limited thereto.

Figure 4:
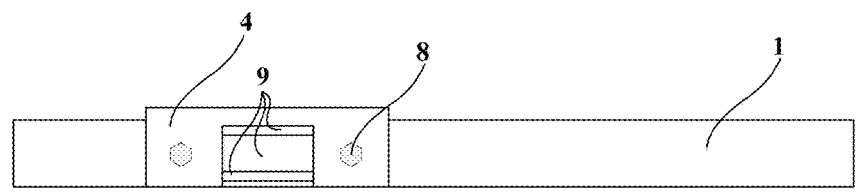
FIG. 4 is a cross-sectional view of a structure taken along B direction in FIG. 1.

The fixed support and the outer side of the side wall of the back plate are connected through, for example, a fastener, and the fastener can be a screw, or the like, for example. As illustrated in FIG. 2 and FIG. 4, the fixed support 4 is an L-shaped fixed support. A portion of the L-shaped fixed support that is perpendicular to the blocking part 41 of the fixed support is connected to the outer side of the side wall of the back plate 1 through a screw 8.

As illustrated in FIG. 4, the bottom reflector 2, the light-guide plate 3 and the optical film unit 7 are each provided with a lug 9, and the side wall of the back plate 1 is provided with a first notch for cooperating with or for receiving the lug 9. A displacement of the bottom reflector, the light-guide plate and the optical film unit can be limited by this structure. With this structure, a displacement-limiting cooperation of the bottom reflector, the light-guide plate and the optical film unit can be achieved, which increases a stability of the structure.

In the embodiment as illustrated in FIG. 4, at least one fixed support 4 is disposed at a position of the first notch in the side wall of the back plate 1 and is provided with a second notch cooperating with the lug 9.

The display panel provided by the embodiments of the present invention includes a LC panel and the backlight unit in any of the preceding embodiments. As illustrated in FIG. 2 and FIG. 3, the LC panel 6 is fixed on the blocking parts 41 of the plurality of fixed supports of the backlight unit.

The LC panel 6 is fixed on the blocking parts 41 of the plurality of fixed supports of the backlight unit through a double-sided tape 5. By fixing the LC panel 6 to the fixed supports 4 through the double-sided tape 5, the assembling process is simplified, and the connection is reliable and the cost is lower.

The display device as provided by the embodiments of the present invention includes the display panel in any of the preceding embodiments.

The display device can be, for example, LCD, tablet computer, liquid crystal TV, mobile phone, digital paper and the like, however, the embodiments of the present invention are not limited thereto.

In the display device as provided by the embodiments of the present invention, the rubber frame is replaced by a plurality of fixed supports, which facilitates realizing the narrow-bezel design of the display device on the premise of permitting the strength of the structure.

The described above are only exemplary embodiments of the present disclosure, and the present disclosure is not intended to limited thereto. For one of ordinary skill in the art, various modifications and improvements may be made without departing from the spirit and scope of embodiments of the present disclosure, and all of these modifications and improvements shall fall within the scope of the present invention.

The present application claims the benefits and priority of Chinese patent application No. 201520633458.0, filed on Aug. 20, 2015 under the title of "BACKLIGHT UNIT, DISPLAY PANEL AND DISPLAY DEVICE," the entire contents of which are incorporated herein by reference.

The invention claimed is:

1. A backlight unit comprising,
   a plurality of fixed supports,
   a back plate provided with a receiving space, wherein each of the fixed supports is connected to an outer side of a side wall of the back plate and comprises a blocking part protruding into upper portion of the receiving space of the back plate;
   a bottom reflector, a light-guide plate and an optical film unit, which are located within the receiving space, wherein the light-guide plate is located on the bottom reflector, and the optical film unit is located on the light-guide plate and below the blocking parts of the plurality of fixed supports,
   wherein the bottom reflector, the light-guide plate and the optical film unit are each provided with a lug, and the side wall of the back plate is provided with a first notch cooperating with the lug.

2. The backlight unit according to claim 1, wherein an outer side of each side wall of the back plate is correspondingly connected to at least one of the fixed supports.

3. The backlight unit according to claim 2, wherein each of the fixed supports is connected to the outer side of each side wall of the back plate through a fastener.

4. The backlight unit according to claim 2, wherein each of the fixed supports is an L-shaped fixed support.

5. The backlight unit according to claim 3, wherein each of the fixed supports is an L-shaped fixed support.

6. The backlight unit according to claim 1, wherein each of the fixed supports is connected to the outer side of each side wall of the back plate through a fastener.

7. The backlight unit according to claim 6, wherein each of the fixed supports is an L-shaped fixed support.

8. The backlight unit according to claim 1, wherein each of the fixed supports is an L-shaped fixed support.

9. The backlight unit according to claim 1, wherein at least one of the fixed supports is disposed at a position of the first notch in the side wall of the back plate and is provided with a second notch cooperating with the lug.

10. A display panel, comprising a liquid crystal (LC) panel and a backlight unit, wherein the backlight unit comprises:
   a plurality of fixed supports,
   a back plate provided with a receiving space, wherein each of the fixed supports is connected to an outer side of a side wall of the back plate and comprises a blocking part protruding into upper portion of the receiving space of the back plate;
   a bottom reflector, a light-guide plate and an optical film unit, which are located within the receiving space, wherein the light-guide plate is located on the bottom reflector, and the optical film unit is located on the light-guide plate and below the blocking parts of the plurality of fixed supports,
   wherein the bottom reflector, the light-guide plate and the optical film unit are each provided with a lug, and the side wall of the back plate is provided with a first notch cooperating with the lug,
   wherein the LC panel is fixed on the blocking parts of the plurality of fixed supports of the backlight unit.

11. The display panel according to claim 10, wherein the LC panel is fixed on the blocking parts of the plurality of fixed supports of the backlight unit through a double-sided tape.

12. The display panel according to claim 10, wherein an outer side of each side wall of the back plate is correspondingly connected to at least one of the fixed supports.

13. The display panel according to claim 10, wherein each of the fixed supports is connected to the outer side of each side wall of the back plate through a fastener.

14. The display panel according to claim 10, wherein each of the fixed supports is an L-shaped fixed support.

15. The display panel according to claim 10, wherein at least one of the fixed supports is disposed at a position of the first notch in the side wall of the back plate and is provided with a second notch cooperating with the lug.

16. A display device, comprising a display panel, wherein the display panel comprises:
   a liquid crystal (LC) panel and a backlight unit, wherein the backlight unit comprises:
      a plurality of fixed supports,
      a back plate provided with a receiving space, wherein each of the fixed supports is connected to an outer side of a side wall of the back plate and comprises a blocking part protruding into upper portion of the receiving space of the back plate;
      a bottom reflector, a light-guide plate and an optical film unit, which are located within the receiving space, wherein the light-guide plate is located on the bottom reflector, and the optical film unit is located on the light-guide plate and below the blocking parts of the plurality of fixed supports,
   wherein the bottom reflector, the light-guide plate and the optical film unit are each provided with a lug, and the side wall of the back plate is provided with a first notch cooperating with the lug,
   wherein the LC panel is fixed on the blocking parts of the plurality of fixed supports of the backlight unit.

17. The display device according to claim 16, wherein an outer side of each side wall of the back plate is correspondingly connected to at least one of the fixed supports.

18. The display device according to claim 16, wherein each of the fixed supports is connected to the outer side of each side wall of the back plate through a fastener.

19. The display device according to claim 16, wherein each of the fixed supports is an L-shaped fixed support.

20. The display device according to claim 16, wherein at least one of the fixed supports is disposed at a position of the first notch in the side wall of the back plate and is provided with a second notch cooperating with the lug.

\* \* \* \* \*